United States Patent Office 3,366,585
Patented Jan. 30, 1968

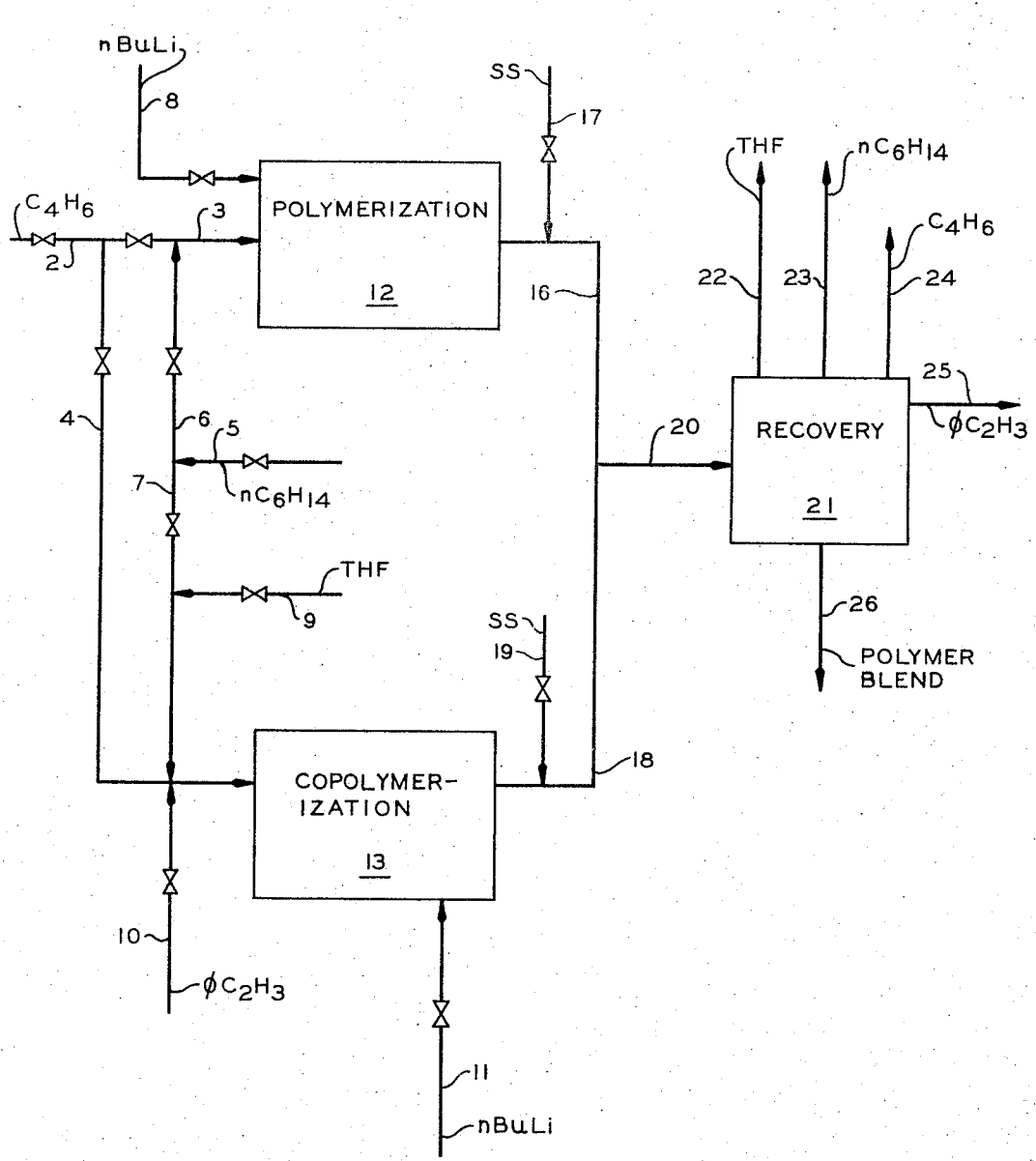

3,366,585
ELASTOMERIC BLEND OF ORGANOLITHIUM-CATALYZED POLYBUTADIENE AND ORGANOLITHIUM-CATALYZED BUTADIENE-STYRENE COPOLYMER
Joseph W. Davison and James Q. Wood, Bartlesville, Okla., assignors to Phillips Petroleum Company, a corporation of Delaware
Filed June 12, 1964, Ser. No. 374,782
4 Claims. (Cl. 260—5)

This invention relates to a blend of elastomers. In one aspect it relates to a blend of rubbery polymers having unexpectedly good properties for the production of tire treads.

The polymerization of 1,3-butadiene and its homologs to produce rubbery polymers in the presence of organolithium catalysts is known in the art. It is also known to copolymerize dienes with vinyl aromatic compounds such as styrene to produce rubbery copolymers, using organolithium compounds as catalysts. Thus highly desirable elastomers can be produced by the polymerization of 1,3-butadiene in a totally hydrocarbon system.

It is also known to produce random copolymers of 1,3-butadiene and styrene by polymerization in the presence of organolithium compounds in a preponderantly hydrocarbon system containing minor proportions of polar organic compounds such as ethers, thioethers and tertiary amines.

An object of this invention is to produce an improved elastomeric blend. Another object of the invention is to produce an elastomer composition suitable for the production of tire treads having high skid resistance and high resistance to abrasion during use in automobile tires. Other objects and advantages will become apparent to those skilled in the art upon reading this disclosure.

The accompanying drawing is a process flow diagram illustrating the production of one embodiment of our invention.

According to this invention there is provided an improved sulfur-vulcanizable rubbery composition of matter comprising a blend of the following: (A) from 15 to 60 parts by weight of a rubbery homopolymer of 1,3-butadiene prepared by polymerization in the presence of an organolithium catalyst in an oxygen-free hydrocarbon medium; and (B) from 85 to 40 parts by weight, respectively, of a random rubbery copolymer of 1,3-butadiene and styrene prepared by copolymerization of a major proportion of butadiene and a minor proportion of styrene in the presence of an organolithium compound and a liquid diluent mixture containing from 0.005 to 50 weight percent, based on the weight of said solvent mixture, of a polar organic compound selected from the group consisting of ethers, thioethers and tertiary amines, the remainder of said solvent mixture being a hydrocarbon which is liquid and inert under the reaction conditions.

In a frequently preferred embodiment of our invention, the polymer blend comprises from 18 to 50 parts by weight of component A and from 82 to 50 parts by weight of component B, respectively.

The individual components of our novel elastomeric blend and the method of producing these individual components do not constitute a part of our present invention.

The rubbery homopolymer of 1,3-butadiene utilized in accordance with our invention and hereinbefore designated component A, can be formed by polymerizing 1,3-butadiene in the presence of an organolithium compound in a totally hydrocarbon system substantially free of oxygen and its compounds. The polymerization occurs in the presence of a liquid diluent which can suitably be selected from the group consisting of liquid paraffinic, cycloparaffinic and aromatic hydrocarbons. Examples of suitable diluents are n-hexane, cyclohexane, toluene, the xylenes, n-octane, isopentane, methylcyclohexane and the dimethylcyclohexanes. The polymerization is suitably conducted at a temperature in the range 50 to 120° C. (120 to 250° F.). However, temperatures outside this range can be used. Polybutadienes produced in this manner generally exhibit the disadvantage of cold flow. This property can be minimized by the incorporation into the reaction mixture of from 0.02 to 1.0 part by weight of a polyvinyl aromatic hydrocarbon per hundred parts by weight of butadiene feed. Suitable divinyl aromatic hydrocarbons for this purpose include the divinylbenzenes, the divinyl naphthalenes, the divinyl anthracenes, 1,2,4-trivinylbenzene, 2,4-divinyl biphenyl and 1,5,6-trivinyl-3,7-diethyl naphthalene. On account of availability, commercial divinylbenzene is generally preferred. The polybutadiene produced in this manner usually has a Mooney plasticity (ML–4) in the range 40 to 150. Analysis by infrared spectrometry indicates a cis-1,4-content of 40 to 45 weight percent, a trans-1,4-content of 25 to 35 percent, and a vinyl (1,2) content of about 25 to 35 percent. Further details of this polymerization process can be found by reference to copending application Ser. No. 210,210 filed July 16, 1962 by Robert P. Zelinski and Henry L. Hsieh, now U.S. Patent No. 3,280,084. Elastomers of this type can be compounded to form tire treads which have excellent abrasion resistance. However, they are somewhat difficult to process in conventional equipment and have lower skid resistance than is ordinarily desired.

Component B in accordance with our invention is a copolymer of 1,3-butadiene and styrene wherein the styrene units are randomly distributed along the carbon chain. This copolymer can be produced by the copolymerization of a major proportion of 1,3-butadiene and a minor proportion of styrene in the presence of an organolithium catalyst at a temperature in the range —20° to 113° C. (—40 to 235° F.). This copolymerization is conducted in the presence of a diluent mixture comprising an inert hydrocarbon of the type described in connection with the production of Component A and from about 0.005 to 50 weight percent, based on total solvent mixture, of a polar organic compound selected from the group consisting of ethers, thioethers and tertiary amines. The presence of the polar compound ensures that the random distribution of the styrene units in the copolymer will be obtained. In a purely hydrocarbon system, a different type of polymer, namely, a block copolymer, is obtained. Suitable polar compounds include ethers such as diethylether, diphenylether and tetrahydrofuran; thioethers such as diethylsulfide and di-n-butyl sulfide; and tertiary amines such as tri-n-propyl amine, triethyl amine, aniline and pyridine. Tetrahydrofuran is frequently preferred. The amount of tetrahydrofuran used is preferably in the range 0.05 to 0.2 weight percent of the total reaction mixture. The random copolymer produced in this manner usually has a Mooney plasticity (ML–4) in the range 50 to 60. Further details of the random copolymer and its production can be ascertained by reference to United States Patent 2,975,160 (1961) to Robert P. Zelinski. These copolymers can be compounded to form tire treads having excellent skid resistance and good abrasion resistance. They are readily processable in conventional equipment.

The organomental catalyst utilized to produce the components of our invention is represented by the formula $RLi_x$ wherein R is a hydrocarbon radical selected from the group consisting of aliphatic, cycloaliphatic, and aromatic radicals and $x$ is an integer in the range 1 to 4. The organic radical R usually contains from 1 to 20 carbon atoms. Specific examples of suitable organic compounds are methyllithium, n-butyllithium, phenyllithium, naphthyllithium, dilithiomethane, 1,4-dilithiocyclohexane, 1,5-dilithioanthracene, and 1,5-dilithionaphthalene. Additional examples of suitable lithium compounds are listed in the Zelinski patent referred to above.

The blend in accordance with our invention can be produced by methods well known in the art for this purpose. Thus the polymers can be individually produced and blended in solution prior to recovery of the polymer blend in crumb form before baling and packaging. Another method is direct blending of individual polymers (solid) in a Banbury mixer or a kneader. A highly advantageous method of producing our blends is illustrated in connection with the accompanying drawing.

In the process illustrated in the drawing, 1,3-butadiene enters the system through inlet 2 and is passed through conduit 3 to polymerization zone 12 and conduit 4 to copolymerization zone 13. Normal hexane (diluent) enters the system through inlet 5 and passes through conduits 6 and 3 to polymerization zone 12, and through conduits 7 and 4 to copolymerization zone 13. Normal butyllithium enters the system through inlet 8 and is passed to polymerization zone 12. Polymerization zone 12 includes a reactor of the types known in the art, suitably a pressure vessel provided with a stirrer. Polymerization zone 12 is suitably maintained within the range 50 to 120° C. (120 to 250° F.). The effluent from polymerization zone 12 passes through conduit 16. A shortstop, e.g., along chain higher fatty acid, such as stearic or palmitic or mixtures of these higher fatty acids, is added through inlet 17 to terminate the polymerization.

In addition to the butadiene and the normal hexane supplied to copolymerization zone 13 there is supplied tetrahydrofuran through inlet 9 and styrene through inlet 10, as well as normal butyllithium through inlet 11. Copolymerization zone 13 can include equipment of the same type as polymerization zone 12. Zone 13 is maintained at a temperature in the range −20° to 113° C. (−4° to 235° F.) and, in some cases, as high as 250° F. (121° C.). The pressure in both polymerization zone 12 and copolymerization zone 13 need be only sufficient to maintain the components predominantly in the liquid phase. The effluent from copolymerization zone 13 is passed through conduit 18. A shortstop such as that previously described is added through inlet 19 to terminate the copolymerization reaction. The effluents from the polymerization zones 12 and 13 are blended and passed through conduit 20 to recovery zone 21. Since both the polybutadiene and the butadiene-styrene copolymer are still in solution in conduit 20, a thorough and intimate admixture is thus obtained. Furthermore, the recovery process is simplified by treating the combined effluent in a common recovery zone. Recovery zone 21, per se, does not form a part of our invention. It usually includes a series of fractional distillation columns and a steam stripper which vaporizes all of the components of the reaction mixture except the polymeric blend. Tetrahydrofuran is recovered through outlet 22, n-hexane through outlet 23, unreacted butadiene through conduit 24 and unreacted styrene through conduit 25. Normally, high conversions of butadiene and styrene are obtained. Trace amounts of unreacted butadiene and styrene are recycled in recovered hexane after purification. These materials can be recycled after suitable purification processes not per se material to the present invention. The polymer blend in accordance with our invention is recovered through conduit 26 and can be treated by kneading in vacuo or otherwise to remove any traces of water or other relatively volatile materials previously described. Conventional finishing processes known in the synthetic rubber art are suitable.

In specific embodiments of our invention, blends were made of random copolymers and polybutadienes and incorporated into tire tread recipes, used to form the tread on passenger automobile tires and were tested in actual road tests to determine resistance to abrasion. Results are shown in the following tabulation in comparison with individual components of the blends and a butadiene-styrene copolymer (SBR 1712) produced by emulsion polymerization and widely utilized in the production of passenger car tires. To the last-mentioned composition was assigned an abrasion rating of 100 for reference purposes. The proportions are in parts by weight.

|  | Philblack I,[1] phr. | Philrich 5,[2] phr. | Abrasion Rating[3] |
|---|---|---|---|
| P 56 ML–4 Copolymer | 65 | 25 | 108 |
| R 120 ML–4 Copolymer | 75 | 50 | 108 |
| S 70/30 56 ML–4 Copolymer/46 ML–4 Polybutadiene | 67 | 30 | 126 |
| T 70/30 120 ML–4 Copolymer/46 ML–4 Polybutadiene | 75 | 50 | 120 |
| U 70/15/15 56 ML–4 Copolymer/46 ML–4 Polybutadiene/Natural Rubber | 64 | 24 | 115 |
| Z 70/15/15 56 ML–4 Copolymer/46 ML–4 Polybutadiene/SBR 1712 | 67 | 30 | 113 |
| X 70/30 56 ML–4 Copolymer/SBR 1712 | 67 | 30 | 105 |
| Y SBR 1712 | 70 | 40 | 100 |
| M 46 ML–4 Polybutadiene | 50 | 10 | 124 |

[1] ISAF carbon black.
[2] A commercial, highly aromatic, hydrocarbon oil used as a rubber plasticizer and extender.
[3] Four 8.50 x 14 passenger-tire retreads are prepared and road tested (usually for 12,000 miles) under the following conditions:
Load per tire, lb. ---------------------- 1,190
Speed, m.p.h. ---------------------- 60
Inflation, p.s.i.g ---------------------- 26
Abrasion ratings are determined by measuring the average residual depth of tread and calculating the tread worn off during the test. The values given are averages for the four tires tested. Tires having SRB-1712 retreads are used as the basis for comparison—i.e., they are arbitrarily rated as 100.

The foregoing data clearly show the unexpectedly high abrasion resistance of the blends according to our invention. In addition, the processing characteristics of the blends approximated those of the copolymers. Furthermore, the skid resistance of the treads prepared from the blends approximated that of the copolymer used in preparing the blend. The abrasion ratings were based on road tests of 8.50 x 14 passenger car tires tested for a distance of 16,000 miles.

The following tabulation shows the actual recipes used in producing the tire treads previously described.

|                        | M    | P    | R    | S    | T     | U      | Z       | X      | Y     |
|------------------------|------|------|------|------|-------|--------|---------|--------|-------|
| 56 ML Copolymer        |      | 100  |      | 70   |       | 70     |         | 70     |       |
| 50 ML Copolymer        |      |      |      |      |       |        | 70      |        |       |
| 120 ML Copolymer       |      |      | 150  |      | 59.43 |        |         |        |       |
| 120 ML Copolymer       |      |      |      |      | 50.73 |        |         |        |       |
| 46 ML Polybutadiene    | 100  |      |      | 30   | 30    | 15     | 15      |        |       |
| #1 Sm. Sheets          |      |      |      |      |       | 15     |         |        |       |
| Philprene 1712         |      |      |      |      |       |        | 20.625  | 41.25  | 157.5 |
| Philblack I #6         | 50   | 65   | 75   | 67   | 75    | 64     | 67      | 67     | 70    |
| Zinc oxide             | 3    | 3    | 3    | 3    | 3     | 3      | 3       | 3      | 3     |
| Stearic Acid           | 2    | 2    | 2    | 2    | 2     | 2      | 2       | 2      | 2     |
| Wingstay 100           | 1    | 1    | 1    | 1    | 1     | 1      | 1       | 1      | 1     |
| Santoflex AW           | 2    | 2    | 2    | 2    | 2     | 2      | 2       | 2      | 2     |
| Paraffin Wax           | 2    | 2    | 2    | 2    | 2     | 2      | 2       | 2      | 2     |
| Philrich 5             | 10   | 25   |      | 30   | 9.84  | 24     | 24.375  | 18.75  | 2.5   |
| Sulfur                 | 2.0  | 2.0  | 2.2  | 2.0  | 2.2   | 2.0    | 2.0     | 2.0    | 2.0   |
| NOBS Special           | 1.1  | 1.2  | 1.3  | 1.2  | 1.3   | 1.1    | 1.2     | 1.2    | 1.2   |
| Polymers               | (1)  | (2)  | (3)  | (4)  | (5)   | (6)    | (7)     | (8)    | (9)   |
| Polymer Ratio          |      | 100  | 100  | 70/30| 70/30 | 70/15/15| 70/15/15| 70/30 | 100   |
| Total Oil, phr         |      | 25   | 50   | 30   | 50    | 24     | 30      | 30     | 40    |

1 46 ML-4 Polybutadiene.
2 56 ML-4 Copolymer.
3 120 ML-4 Copolymer.
4 56 ML-4 Copolymer/polybutadiene.
5 120 ML-4 Copolymer/polybutadiene.
6 56 ML-4 Copolymer/polybutadiene/natural rubber.
7 56 ML-4 Copolymer/polybutadiene/1712.
8 56 ML-4 Coyolymer/1712.
9 SBR 1712.

From the foregoing, it will be understood by those skilled in the art that other elastomers can be incorporated into our blends, as shown in the foregoing specific embodiments. Suitable elastomers for this purpose are natural rubber and various rubbery styrene-butadiene rubbery copolymers. These are generally incorporated in amounts approximately equal to the amount of polybutadiene in the blend. It will further be evident to those skilled in the art that the blends can contain the usual compounding ingredients for the production of tire treads such as accelerators, antioxidants, vulcanizing agents, pigments (e.g., carbon black), plasticizer and extender oils and other materials commonly used in the art in tire tread compositions.

We claim:
1. A sulfur vulcanizable rubbery composition of matter having high abrasion resistance comprising
   (a) from 15 to 60 parts by weight of a rubbery homopolymer of 1,3-butadiene prepared by polymerization in the presence of an organolithium catalyst in oxygen-free hydrocarbon medium free of polar solvents; and
   (b) from 85 to 40 parts by weight, respectively, of a random rubbery copolymer of 1,3-butadiene and styrene prepared by copolymerization of a major proportion of butadiene and a minor proportion of styrene in the presence of an organolithium compound and a liquid diluent mixture containing from 0.005 to 50 weight percent, based on the weight of said solvent mixture, of a polar organic compound selected from the group consisting of ethers, thioethers and tertiary amines, the remainder of said diluent mixture being a hydrocarbon selected from the group consisting of aliphatic, cycloaliphatic and aromatic hydrocarbons.

2. A composition according to claim 1 comprising from 18 to 50 parts by weight of said homopolymer and 82 to 50 parts by weight, respectively, of said copolymer, said organolithium compound being n-butyllithium, said homopolymer having been produced in the presence of n-hexane as a diluent at a temperature in the range 120 to 250° F. and in the presence of from 0.02 to 1.0 weight percent of divinylbenzene based on the weight of butadiene charged, said homopolymer having a Mooney plasticity (ML-4) in the range 40 to 150, a cis-1,4 content in the range 40 to 45 percent, a trans-1,4 content in the range 25 to 35 weight percent and a vinyl content in the range 25 to 35 percent; said copolymer having been produced in the presence of n-hexane as a diluent and from 0.05 to 0.2 weight percent, based on total reaction mixture, of tetrahydrofuran, said copolymer having a Mooney plasticity (ML-4) in the range 50 to 60.

3. A composition according to claim 2 wherein said blend further comprises a third elastomer selected from the group consisting of natural rubber and butadiene-styrene copolymer produced by emulsion polymerization, said third copolymer being present in an amount approximately equal to that of said homopolymer.

4. A tire tread produced by the sulfur vulcanization of a tire tread composition comprising the blend set forth in claim 1 as the essential elastomeric ingredient.

References Cited
UNITED STATES PATENTS
2,975,160  3/1961  Zelinski _____ 260—80.7 XR
3,157,218  11/1964  Brown _____ 260—894 XR

FOREIGN PATENTS
817,693  8/1959  Great Britain.

OTHER REFERENCES
Smith et al.: "Compounding and Testing Diene Rubber," AGE, vol. 87, No. 5, August 1960, pp. 815–822.

GEORGE F. LESMES, Primary Examiner.
MURRAY TILLMAN, Examiner.